United States Patent
Iaquaniello et al.

(10) Patent No.: US 10,889,495 B2
(45) Date of Patent: Jan. 12, 2021

(54) METHOD FOR STABLE ETHANOL STEAM REFORMING

(71) Applicant: KT—Kinetics Technology S.P.A., Rome (IT)

(72) Inventors: Gaetano Iaquaniello, Rome (IT); Emma Palo, Battipaglia (IT); Vincenzo Palma, Castellammare di Stabia (IT); Antonio Ricca, Luogosano (IT); Concetta Ruocco, Scafati (IT)

(73) Assignee: KT—KINETICS TECHNOLOGY S.P.A., Rome (IT)

( * ) Notice: Subject to any disclaimer, the term of this patent is extended or adjusted under 35 U.S.C. 154(b) by 0 days.

(21) Appl. No.: 16/306,482

(22) PCT Filed: May 30, 2017

(86) PCT No.: PCT/IB2017/053165
§ 371 (c)(1),
(2) Date: Nov. 30, 2018

(87) PCT Pub. No.: WO2017/208142
PCT Pub. Date: Dec. 7, 2017

(65) Prior Publication Data
US 2019/0210870 A1    Jul. 11, 2019

(30) Foreign Application Priority Data
May 31, 2016 (IT) .................. 102016000056473

(51) Int. Cl.
*C01B 3/32* (2006.01)
*B01J 8/02* (2006.01)
*B01J 38/06* (2006.01)

(52) U.S. Cl.
CPC .............. *C01B 3/323* (2013.01); *B01J 8/025* (2013.01); *B01J 8/0242* (2013.01); *B01J 8/0278* (2013.01);
(Continued)

(58) Field of Classification Search
CPC ....................................................... C01B 3/323
See application file for complete search history.

(56) References Cited

U.S. PATENT DOCUMENTS

| | | | | |
|---|---|---|---|---|
| 5,597,474 A | * | 1/1997 | Kerby | ..................... C10B 55/10 208/50 |
| 7,572,429 B1 | * | 8/2009 | Neylon | ..................... C01B 3/38 252/373 |

(Continued)

FOREIGN PATENT DOCUMENTS

WO    WO 2009/065371 A1    5/2009
WO    WO 2012/154042 A1    11/2012

OTHER PUBLICATIONS

Metal-catalysed steam reforming of ethanol in the production of hydrogen for fuel cell applications. J.P. Breen et al Applied Catalysis B: Environmental, V39, pp. 65-74 (Year: 2002).*

International Search Report and Written Opinion, issued by International Searching Authority in corresponding International Application No. PCT/IB2017/053165, dated Aug. 1, 2017(PCT/ISA/210 & PCT/ISA/237).

(Continued)

*Primary Examiner* — Douglas B Call
(74) *Attorney, Agent, or Firm* — Arent Fox LLP

(57) ABSTRACT

Method for stable ethanol steam reforming, wherein a catalytic ethanol reforming is carried out in two vessels operating in parallel mode both filled in with a catalyst active for this reaction, with the first vessel acting in operation mode, generating an hydrogen rich stream, and the parallel vessel, acting in regeneration mode, made flowing with steam in order to carry out the gasification of carbonaceous compounds deposited on the catalyst.

16 Claims, 1 Drawing Sheet

(52) U.S. Cl.
CPC .............. *B01J 8/0285* (2013.01); *B01J 38/06* (2013.01); *B01J 2208/00371* (2013.01); *B01J 2219/00038* (2013.01); *C01B 2203/0233* (2013.01); *C01B 2203/10* (2013.01); *C01B 2203/1229* (2013.01); *C01B 2203/141* (2013.01); *C01B 2203/1604* (2013.01); *C01B 2203/1609* (2013.01)

(56) References Cited

U.S. PATENT DOCUMENTS

| | | | |
|---|---|---|---|
| 2009/0165368 A1* | 7/2009 | Liu ........................ | C01B 3/323 44/451 |
| 2010/0058665 A1* | 3/2010 | Pinho .................... | C01B 3/323 48/209 |
| 2012/0207668 A1* | 8/2012 | Schmidt ................. | C01B 3/323 423/653 |
| 2014/0084214 A1* | 3/2014 | Compagne .............. | B01J 23/94 252/373 |

OTHER PUBLICATIONS

Palma et al., "CeO2-supported Pt/Ni catalyst for the renewable and clean H2 production via ethanol steam reforming", Applied Catalysis B: Environmental, vol. 145, 2014, pp. 73-84.

Roh et al., "Catalyst deactivation and regeneration in low temperature ethanol steam reforming with Rh/CeO2-ZrO2 catalysts", Catalysis Letters, vol. 110, Nos. 1-2, Aug. 1, 2006, pp. 1-6, DOI: 10.1007/s10562-006-0082-2.

* cited by examiner

METHOD FOR STABLE ETHANOL STEAM REFORMING

CROSS-REFERENCE TO RELATED APPLICATIONS

This application is a National Stage entry of International Application No.: PCT/IB2017/053165, filed May 30, 2017, which claims priority to Italian Patent Application No. 102016000056473, filed May 31, 2016. The disclosures of the priority applications are hereby incorporated in their entirety by reference.

SUMMARY OF THE INVENTION

Method and apparatus for stable ethanol steam reforming, wherein a catalytic ethanol reforming is carried out in two vessels operating in parallel mode both filled in with a catalyst active for this reaction, with the first vessel acting in operation mode, generating an hydrogen rich stream, and the parallel vessel, acting in regeneration mode, made flowing with steam in order to carry out the gasification of carbonaceous compounds deposited on the catalyst.

FIELD OF THE INVENTION

The invention pertains to process architecture suitable for the catalytic reaction of ethanol steam reforming characterised by an improved method for catalyst regeneration after chemical deactivation owing to coke formation.

BACKGROUND OF THE INVENTION

The shortage of hydrocarbon-based energy reserves and the environmental concerns rising from fossil fuels use is pushing to the development of sustainable chemical processes based on the deployment of renewable sources. Clean hydrogen production and utilization is expected to become a feasible solution for a decarbonised energy production [1].

Currently, $H_2$ is mainly generated via methane steam reforming (Eq. 1). However, in order to exploit the maturity of reforming technology and, at the same time, limit emissions-related problems, ethanol reforming is regarded as a promising route for hydrogen production.

$$CH_4 + H_2O \leftrightarrow 3H_2 + CO \quad \text{(Eq. 1)}$$

Bio-ethanol (namely ethanol produced from biomass) as hydrogen source has several benefits; for example, it assures $CO_2$-emission neutrality (the carbon dioxide produced by ethanol conversion will be consumed during biomass growth) and such aqueous solution (10-18 wt % in ethanol [2]) can be directly employed for steam reforming, thus avoiding the expensive costs for water separation and increasing the overall energy efficiency of the process.

Typical routes for hydrogen production from ethanol include steam reforming, partial oxidation and oxidative steam reforming. Ethanol steam reforming (Eq. 2) can potentially produce a high hydrogen amount per mole of converted reactant with no by-products formation other than carbon dioxide (according to the stoichiometry, 6 mol of $H_2$ with respect to 1 mol of $C_2H_5OH$ reacted).

$$C_2H_5OH + 3H_2O \leftrightarrow 6H_2 + 2CO_2 \quad \text{(Eq. 2)}$$

Under a thermodynamic point of view, high temperatures and steam/ethanol molar ratios promote $H_2$ yield: 5.1 ($mol_{H2}/mol_{C2H5OH}$) of hydrogen yield can be reached at 700° C. and steam to ethanol ratio of 6. On the other hand, moderate temperature and high water content in the reforming mixture can limit carbon monoxide formation, thus avoiding its easy conversion to coke through Boudouard reaction (Eq. 3). Moreover, a reduced content of carbon monoxide in the downstream gas can result in lower impact of further purification stages (e.g. water gas shift unit (Eq. 4)). Energy balance on the system evidenced that at high temperatures the contribution of steam reforming reactions results in a marked increasing of overall enthalpy, enhancing process endothermicity. On the other hand, at lower temperature, the exothermic contribution of water gas shift (Eq. 4) and methanation (Eq. 5) reactions reduces the external heat supply and the overall energy penalty; the auto-thermal point ($T_{react}=T_{prod}$), at which the system is completely thermally self-sustained, depends on feed ratios steam/ethanol and operating pressure.

$$2CO \leftrightarrow CO_2 + C \quad \text{(Eq. 3)}$$

$$CO + H_2O \leftrightarrow CO_2 + H_2 \quad \text{(Eq. 4)}$$

$$CO + 3H_2O \leftrightarrow CH_4 + H_2O \quad \text{(Eq. 5)}$$

The typical products distribution of ethanol steam reforming reaction, according to thermodynamic evaluations, results in considerable hydrogen production rates above 500° C. and high methane yields at T<450° C. (FIG. 1).

However, depending on the selected operating conditions (temperature, ethanol partial pressure, steam to ethanol molar ratio, space velocity) and the used catalyst, different reaction pathways can be observed, which reduce the desired product selectivity. In particular, the easy transformation of ethanol to acetaldehyde, ethylene, acetone or other by-products through decomposition (not considered in FIG. 1), dehydrogenation and dehydration reaction strongly affects $H_2$ yields, but above all could represent precursors for carbonaceous compounds that, depositing on the catalyst, determine its irreversible deactivation, and accordingly limiting the application of the process at industrial level.

The main pathways responsible for coke deposition include methane decomposition (Eq. 6), Boudouard reaction (Eq. 3) and ethylene polymerization (Eq. 7) [3]. Alternatively, carbon formation from ethylene could occur through decomposition followed by accumulation and polymerization of carbon atoms (Eq. 8).

$$CH_4 \leftrightarrow 2H + C \quad \text{(Eq. 6)}$$

$$C_2H_4 \rightarrow polymers \rightarrow coke \quad \text{(Eq. 7)}$$

$$C_2H_4 \rightarrow 2C + 2H_2 \rightarrow coke \quad \text{(Eq. 8)}$$

Low reaction temperatures generally favour the Boudouard mechanism while (Eq. 6) is the main route at high temperatures. Moreover, depending on the reaction temperature, both amorphous and graphitized carbon can be produced.

Accordingly, there is a big interest in the literature in finding a way to enhance the stability of the catalyst.

Under an industrial point of view, the operating conditions at which to operate the process are affected by several parameters. On the basis of the previous considerations and taking into account that the proper temperature selection may assure a considerable reduction of external thermal duty and overall energy penalty, the opportunity of performing ethanol steam reforming at T<600° C. appears very promising. However, the choice of carrying out steam reforming reaction in the low-temperature and/or high pressure ranges (to exploit exothermic reactions) may negatively effect on catalyst stability due to coking phenomena. On the other hand, excess water operations, despite can minimize carbon selectivity, involves a sensible growth in plant variable operating costs. Therefore, the main challenge of ethanol reforming process intensification lies in the development of active at low-temperature and coke-resistant catalysts. Several noble (Pt, Pd, Ru, Rh, Ir)/non-noble (Co, Ni) metals supported on different oxides [1] as well as more complex formulations (including perovskites) were reported as suitable catalysts active for ethanol steam reforming reaction. However, the main drawback of such formulations was represented by the poor stability affected by coke formation on the surface. Several attempts have been made in the literature to improve the catalyst resistance to deactivation, for instance through the addition of $CeO_2$ and $La_2O_3$ to $Ni/Al_2O_3$ catalysts, or by the addition of a second metal that can induce significant changes in the catalytic properties of the final system [4,5]. However, despite the huge amount of work performed in the literature to make the catalyst less prone to deactivation under coke formation, a lack of information about catalyst stability in long term tests is still evidenced, in particular when the operating temperature is below 600° C. and at high ethanol partial pressures.

Accordingly, it would be desirable to provide a method and an architecture to improve the catalyst stability in the range of temperature between 300 and 600° C., and at relatively high operating ethanol partial pressures.

One possibility can be based on the recognition that it is not possible to completely exclude the deposition on the coke on the catalyst; accordingly a periodic regeneration of it is necessary.

This process is not novel in the state of the art, since commercialised technology for selective propane dehydrogenation to propylene still considers a series of parallel reactors, with some of them in processing the ethanol feed, and the others in regeneration in situ of the catalyst with air stream. This type of regeneration foresees an oxidation of the coke deposited on the catalyst with a consequent heat release. However, it must be taken into account that during this process of regeneration, an additional mechanism of deactivation may occur, due to catalyst particle agglomeration (sintering), owing to exposure of the catalyst at high temperature and accordingly to a reduction in active specific surface area. Periodic regenerations of the catalytic bed (to burn off deposited coke) make the sintering deactivation severe. Reference is made, e.g., to "Chemical Process Technology" by J. A. Moulijn, M. Makkee, A. van Diepen (2001) Wiley.

Accordingly, it would be desirable to provide a method and architecture to regenerate the catalyst activity after coke deposition, without loss of activity owing to active species sintering phenomena.

SUMMARY OF THE INVENTION

In order to better address one or more of the foregoing desires, the invention presents in one aspect an architecture for catalytic ethanol reforming where the reaction is carried out in two vessels operating in parallel, with the first generating the hydrogen rich stream, and the parallel vessel made flowing with steam at high temperature in order to carry out the gasification of carbonaceous compounds.

Other aspects and advantages will be apparent from the following drawings, the following detailed description and the appended claims.

DETAILED DESCRIPTION OF THE INVENTION

Figure 1:
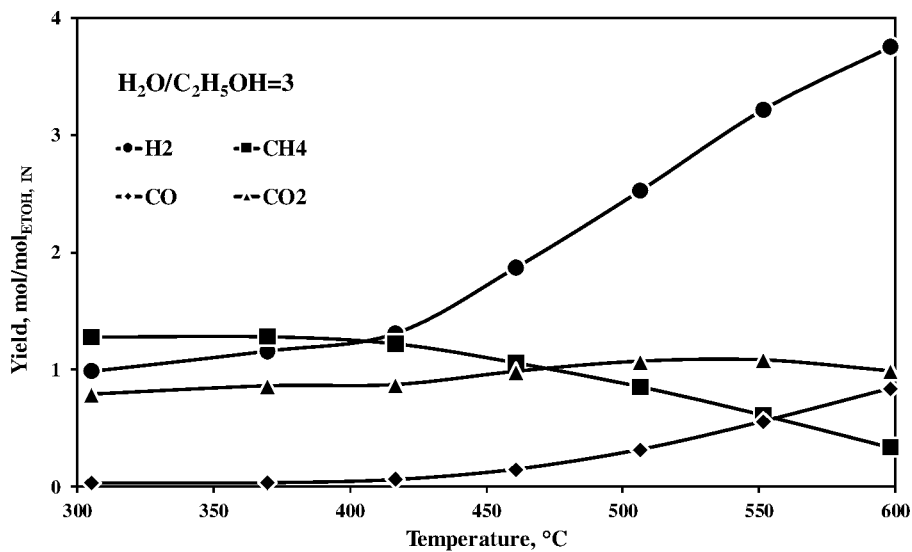
FIG. 1 shows the thermodynamic product distribution in ethanol steam reforming.
Figure 2:
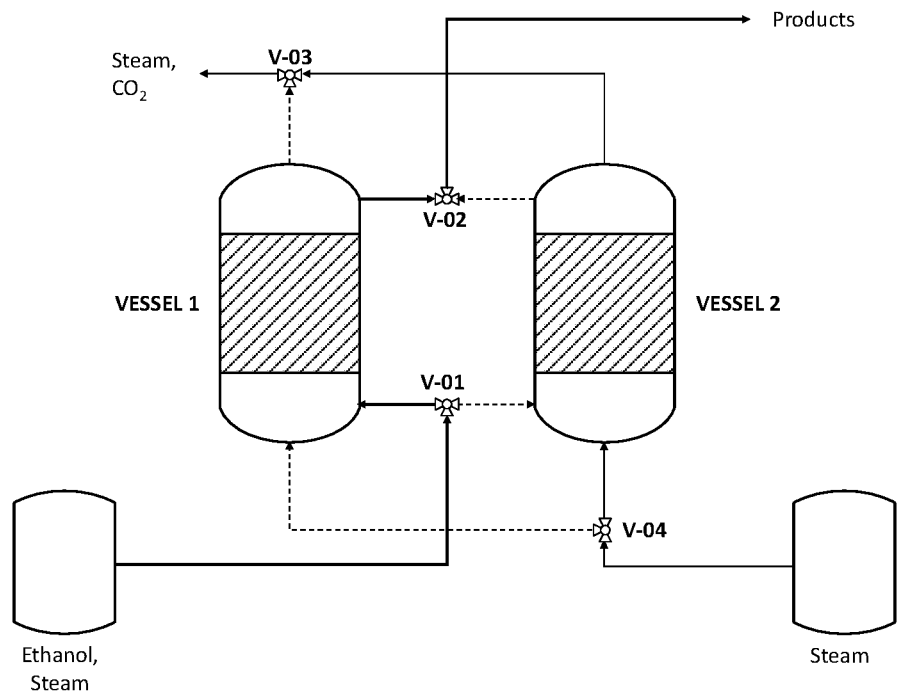
FIG. 2 shows an ethanol steam reforming reactor, with two vessels operating in parallel, in operation/regeneration mode.

According to the invention, the reaction of ethanol steam reforming and catalyst regeneration is carried out in parallel vessels, according to the FIG. 2.

The invention is based on the fact that while one vessel is made flowing with an ethanol rich gaseous stream to generate a mixture of products containing hydrogen, the parallel vessel is made flowing with superheated steam to regenerate the catalyst. In this way, the overall system is operated continuously in operation/regeneration mode.

According to FIG. 2, the catalytic ethanol reforming is carried out in two vessels operating in parallel, with the first, 1, generating the hydrogen rich stream, and the parallel vessel 2 made flowing with superheated steam at high temperature in order to carry out the gasification of carbonaceous compounds.

In particular, when the vessel 1 is under operation, the vessel 2 is under regeneration. Under such configuration, the ethanol rich gaseous stream is routed under pressure through the valve V-01 to the first vessel 1 and the reaction products, containing hydrogen, are collected through the valve V-02 for downstream conversion steps. At the same time a stream of superheated steam at low pressure is routed to vessel 2 for regeneration through the valve V-04, and the product of regeneration, mainly steam and CO2, are collected through the valve V-03.

On the contrary, when vessel 2 is under operation, the ethanol rich gaseous stream is routed under pressure through the valve V-01 to vessel 2 and the reaction products, containing hydrogen, are collected through the valve V-02 for downstream conversion steps. At the same time a stream of steam at low pressure is routed to vessel 1 for regeneration of the catalyst through the valve V-04, and the product of regeneration, mainly steam and CO2, are collected through the valve V-03.

The catalytic ethanol reforming is conducted in the presence of steam. The quantity of steam fed to the reactor is selected so as to achieve the optimal steam/ethanol ratios in the feedstock to enhance the yield of the process. Preferably, steam/ethanol ratio in the feedstock should be in the range 2:1-6:1, more preferably in the range 3:1-5:1, still more preferably in the range 4:1-4.5:1. It should be emphasised that the presence of excess steam in the feedstock enables to inhibit carbonaceous compounds formation on the catalyst.

In the preferred embodiment, selected reaction temperature to reduce energy penalty while maintaining an high hydrogen yield are in the range 300-600° C., preferably in the range 450-550° C., still more preferably at 500° C.

In the preferred embodiment, selected operating reaction pressure is in the range 10-30 bar, preferably in the range 15-25 bar, still more preferably at 20 bar.

The catalyst regeneration is conducted in the presence of superheated steam at high temperature and low pressure. In the preferred embodiment, selected regeneration temperature is in the range 400-600° C., preferably in the range 450-575° C., still more preferably at 550° C.

In the preferred embodiment, selected operating regeneration pressure is in the range 1.1-7 bar, more preferably 1.1-5 bar, still more preferably 3 bar.

REFERENCES

1. Chi-Shen Lee "Ethanol reforming catalyst composition and method of producing ethanol reforming catalyst". No. US 2014/0213440 A1, Jul. 31, 2014.
2. A. L. A. Marinho, R. C. Rabelo-Neto, F. B. Noronha, L. V. Mattos, Appl. Catal. A: Gen. 520 (2016) 53-64.
3. A. L. A. Marinho, R. C. Rabelo-Neto, F. B. Noronha, L. V. Mattos, Appl. Catal. A: Gen. 520 (2016) 53-64.
4. L. Zhao, T. Han, H. Wang, L. Zhang, Y. Liu, Appl. Catal. B: Environ. 187 (2016) 19-29.
5. V. Palma, F. Castaldo, P. Ciambelli, G. Iaquaniello, Appl. Catal. B: Environ. 145 (2014) 73-84.

The invention claimed is:

1. A method for ethanol steam reforming, comprising carrying out ethanol catalytic steam reforming in two vessels, a first vessel and a second vessel operating in parallel, each vessel filled in with a catalyst active for ethanol catalytic steam reforming and the vessels alternately performing ethanol catalytic steam reforming and a catalyst regeneration, wherein, while the first vessel, acting in an ethanol catalytic steam reforming mode, is made flowing with an ethanol rich gaseous stream under pressure to generate a hydrogen rich stream, the second vessel, acting in a catalyst regeneration mode, is made flowing with superheated steam at a pressure lower than the pressure under which the ethanol rich gaseous stream is flowing in order to carry out gasification of carbonaceous compounds deposited on the catalyst, and wherein the catalyst regeneration is carried out at a temperature higher than the temperature at which the ethanol catalytic steam reforming is carried out, both temperatures being lower than or equal to 600° C.

2. The method of claim 1 wherein the ethanol catalytic steam reforming is carried out with a steam/ethanol ratio in the range of 2:1-6:1.

3. The method of claim 2 wherein the catalytic reforming is carried out with a steam/ethanol ratio in the range of 3:1-5:1.

4. The method of claim 2 wherein the catalytic reforming is carried out with a steam/ethanol ratio in the range of 4:1-4.5:1.

5. The method of claim 1 wherein the ethanol catalytic steam reforming is carried out in the temperature range 300-600° C.

6. The method of claim 5 wherein the catalytic reforming is carried out in the temperature range 450-550° C.

7. The method of claim 5 wherein the catalytic reforming is carried out at 500° C.

8. The method of claim 1 wherein the ethanol catalytic steam reforming is carried out in the pressure range 10-30 bar.

9. The method of claim 8 wherein the catalytic reforming is carried out in the pressure range 15-25 bar.

10. The method of claim 8 wherein the catalytic reforming is carried out at 20 bar.

11. The method of claim 1 wherein the catalyst regeneration is carried out at a temperature in the range of 400-600° C.

12. The method of claim 11 wherein the catalyst regeneration is carried out at a temperature in the range of 450-575° C.

13. The method of claim 11 where the catalyst regeneration is carried out at 550° C.

14. The method of claim 1 wherein the catalyst regeneration is carried out at a pressure in the range of 1.1-7 bar.

15. The method of claim 1 wherein the catalyst regeneration is carried out at a pressure in the range of 1.1-5 bar.

16. The method of claim 1 wherein the catalyst regeneration is carried out at 3 bar.

* * * * *